T. G. O'CONNOR.
SCAFFOLDING.
APPLICATION FILED DEC. 26, 1916.
1,246,989.
Patented Nov. 20, 1917.
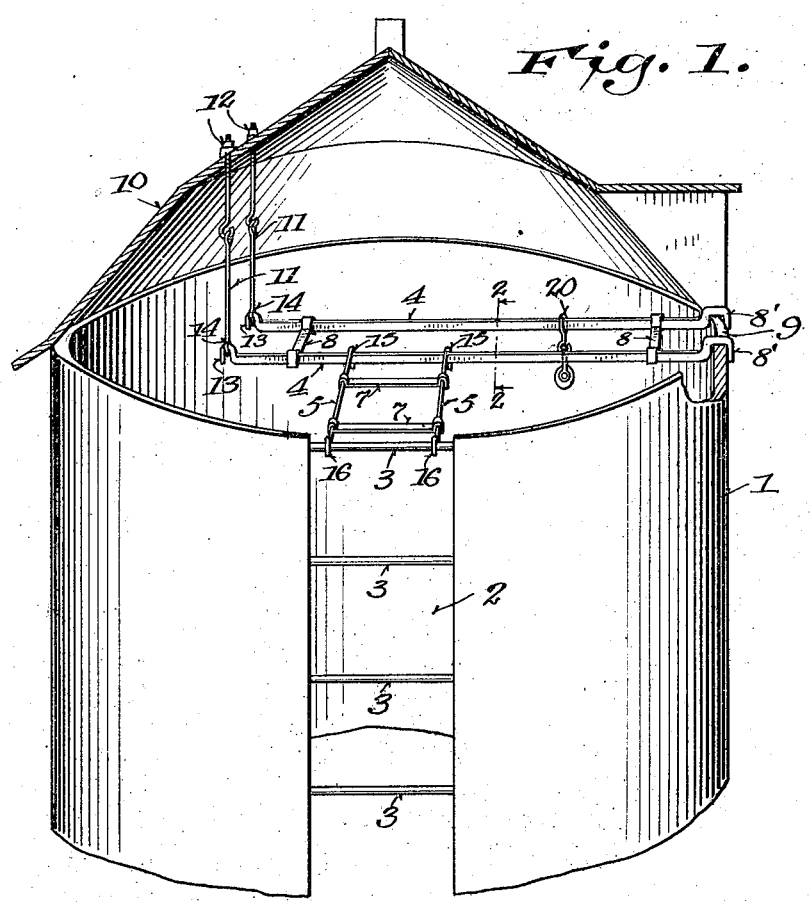
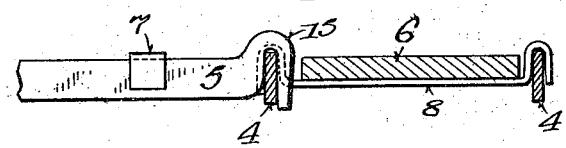
Inventor
Thomas G. O'Connor
By Erwin & Wheeler
Attorneys.

UNITED STATES PATENT OFFICE.

THOMAS G. O'CONNOR, OF OSCEOLA, WISCONSIN.

SCAFFOLDING.

1,246,989.    Specification of Letters Patent.    Patented Nov. 20, 1917.

Application filed December 26, 1916. Serial No. 138,986.

*To all whom it may concern:*

Be it known that I, THOMAS G. O'CONNOR, a citizen of the United States, residing at the town of Osceola, county of Fond du Lac, and State of Wisconsin, have invented new and useful Improvements in Scaffolding, of which the following is a specification.

My invention relates to improvements in scaffolding. The object of my invention is to provide a device that is easily and quickly connected with the sides and roof of a silo, and upon which a person may stand both when raising and adjusting an air blast duct of a blower used for elevating ensilage and discharging the same into a silo.

My invention is further explained by reference to the accompanying drawing, in which Figure 1 is a perspective view of the upper end of a silo provided with my device, part being shown in vertical section, and Fig. 2 is a side view of a portion of a scaffolding, showing a plank or board supported therefrom.

Like parts are referred to by the same reference numerals in both views.

1 represents the vertical walls of a silo, of ordinary construction. 2 is a doorway which extends from the bottom to the top of the silo. 3 are rungs of a ladder upon which a person ascends or descends from or to the bottom of the silo. 4, 4 and 5, 5 are metallic bars or rods from which a plank or board 6 is adapted to be supported by the cross bars 7, 7 and 8, 8. One end of each of the bars 4, 4 is provided with a hook 8', which is adapted to engage the upper edge 9 of the silo, while the opposite ends of said bars are connected with the roof 10 by a plurality of rods 11 and nuts 12. Said rods 11 are connected to the bars 4 by hooks 13 and eyes or loops 14. The bars or rods 5, 5 are supported at one of their ends by one of the bars 4 and at their opposite ends from one of the rungs 3, said bars or rods 5 being provided at one end with hooks 15, which engage one of the bars 4, and at their opposite end with hooks 16 which engage one of said rungs.

Connected with one of the horizontal members 4 is a plurality of links 20, the lower end of said links being adapted to be connected with a blow pipe or any other device which is adapted to be raised to the upper part of the silo by ropes, tackle blocks, or in any convenient manner.

Having thus described my invention what I claim as new and desire to secure by Letters Patent, is:—

1. In a device of the described class, the combination with a silo, of a pair of horizontal members, means for connecting one end of said members with the vertical walls of said silo, means for connecting the opposite ends of said horizontal members with the roof of said silo, a plurality of transverse members supported from said horizontal members, and a plank supported upon said transverse members.

2. In a device of the described class, the combination with a silo, of a pair of horizontal members, means for connecting one end of said members with the vertical walls of said silo, means for connecting the opposite ends of said horizontal members with the roof of said silo, a plurality of transverse members supported from said horizontal members, and a plank supported upon said transverse members, a ladder, and a second pair of horizontal members, means for connecting one end of said second pair of horizontal members with one of said first named pair of horizontal members, and means for connecting the opposite end of said second pair of horizontal members with one of the rungs of a ladder.

3. In a device of the described class, the combination with a silo, of a pair of horizontal members, each provided at their respective ends with downwardly extending hooks, a plurality of transverse members supported from said horizontal members, and a plank supported from said transverse members.

4. In a device of the described class, the combination with a silo, of a pair of horizontal members, each provided at their respective ends with downwardly extending hooks, a plurality of transverse members supported from said horizontal members, a second pair of horizontal members, each provided at their respective ends with downwardly extending hooks, a plurality of transverse members supported from said
5 second pair of horizontal members, and a plank supported from both sets of transverse members.

In testimony whereof I affix my signature in the presence of two witnesses.

THOMAS G. O'CONNOR.

Witnesses:
 OVID BONDRY,
 JOHN P. McGALLOWAY.

Copies of this patent may be obtained for five cents each, by addressing the "Commissioner of Patents, Washington, D. C."